UNITED STATES PATENT OFFICE.

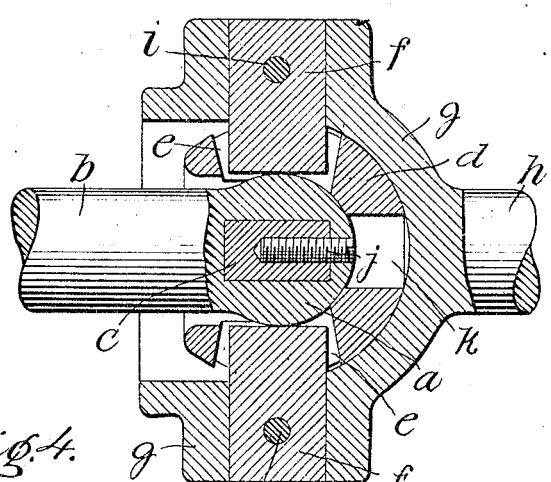
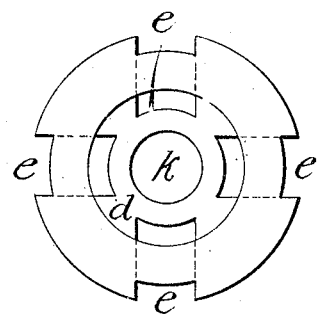
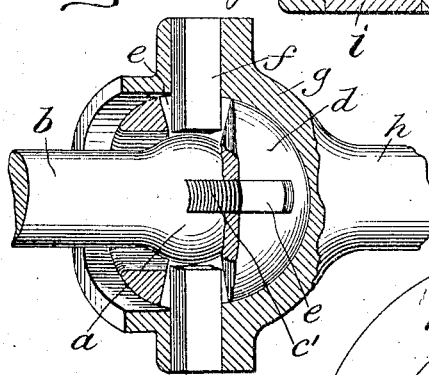
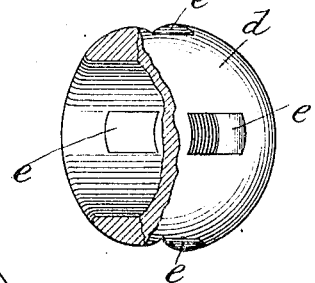
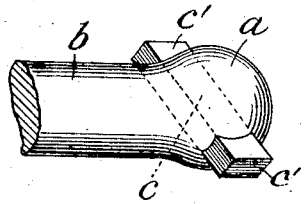
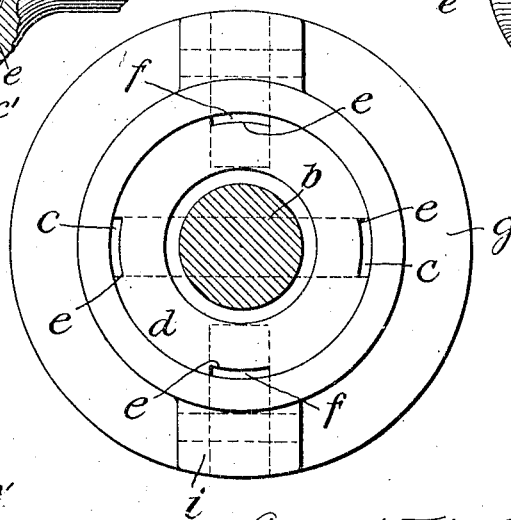

ARMAND FARKAS AND JOSEPH KIEFFER, OF PARIS, FRANCE.

JOINT.

No. 856,777.  Specification of Letters Patent.  Patented June 11, 1907.

Application filed January 9, 1906. Serial No. 295,318.

*To all whom it may concern:*

Be it known that we, ARMAND FARKAS and JOSEPH KIEFFER, citizens of France, and residing 13 Rue Taitbout, Paris, France, have invented certain new and useful Improvements in Joints, of which the following is a specification.

This invention relates to a joint which in particular is intended for use as a coupling for divided axles used in certain kind of motor vehicles.

In the accompanying drawing: Figure 1 is a longitudinal section through a joint according to our invention. Fig. 2 is a detail view and Fig. 3 is a front view of the joint. Fig. 4 is a side view of the joint with parts of the socket member and cap broken away; Fig. 5 is a perspective view of the ball member, and Fig. 6 is a perspective view of the cap with a part broken away.

The joint consists of a ball $a$ secured to or forming part of one of the shafts to be coupled together, such as $b$. The ball is provided with a transverse perforation at right angles to the shaft $b$, in which perforation is inserted a key $c$ which terminates in two projecting tenons $c'$ diametrically opposite one another. The ball $a$ is surrounded by a spherical cap $d$ provided with four orifices or mortises $e$ of similar shape, disposed radially relatively to the center of the cap and at an angle of 90° to one another. The tenons $c'$ of the key $c$ project through two of the orifices $e$ and into the remaining two orifices project two blocks $f$, which are secured at opposite points to a socket-member $g$ and at right angles to the key $c$. The socket-member $g$ is secured to or forms part of the other shaft $h$ and its inner surface is spherical and fits around the spheric exterior surface of the cap $d$ in such a manner as to form a swivel-joint providing for the union of the two shafts $b$ and $h$. The width of the orifices $e$ is the same as the thickness of the tenons $c'$ of the key $c$ and the blocks $f$, but the length of the orifices is greater than the width of the tenons and the blocks in order to permit of free displacement of the contact pieces during the different oscillatory or angular movements which they make relatively to one another during the rotation of the shafts when the shafts do not extend in a straight line. The key $c$ and the blocks $f$ may be secured in any suitable manner such as by means of pins $i$ or screws $j$. The cap $d$ is provided with a perforation $k$ in order to permit of the insertion of the screw $j$. The socket-member $g$ may be coupled to any suitable driving member instead of being secured directly on the shaft $h$.

Having described our invention, what we claim as new is:

1. In a joint, the combination of a socket member, a spherical cap arranged within the socket member and having four radial orifices therein, a ball member arranged within the cap, and a pair of oppositely arranged blocks extending inwardly from the socket member and into two of the orifices in the cap, said ball member having a pair of oppositely arranged tenons extending outwardly from the ball member and into the other two orifices in the cap.

2. In a joint, the combination of a socket member having an inner spherical surface, a spherical cap loosely arranged within the socket member and having two pair of radial orifices therein, a ball member arranged within the cap, and a pair of oppositely arranged blocks extending inwardly from the socket member and into one pair of orifices in the cap, said ball member having a pair of oppositely arranged tenons extending outwardly from the ball member and into the other pair of orifices in the cap, the width of said orifices being equal to the thickness of the blocks and tenons and the length of the orifices being greater than the width of the blocks and tenons.

The foregoing specification signed at Paris, France this twenty-fourth day of May, 1905.

ARMAND FARKAS.
JOSEPH KIEFFER.

In presence of—
HANSON C. COXE,
ETIENNE CARDINAL.